Figure 1:
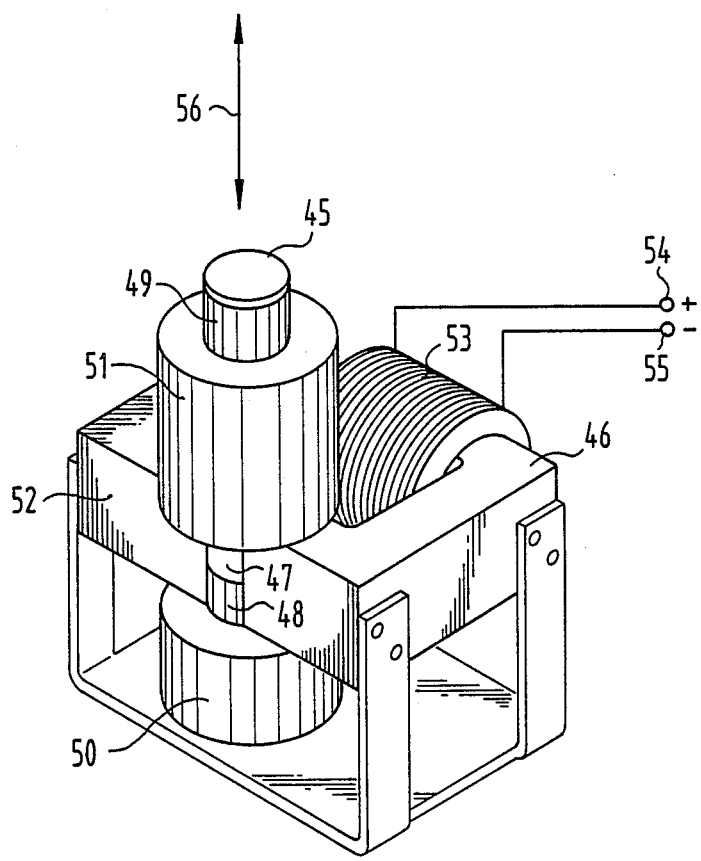

United States Patent [19]
Kessler

[11] Patent Number: 4,900,054
[45] Date of Patent: Feb. 13, 1990

[54] ELECTROMAGNETIC SUPPORT ARRANGEMENT

[76] Inventor: Manfred Kessler, Im Hofacker 17, Urmitz/Rhein, Fed. Rep. of Germany, 5401

[21] Appl. No.: 255,181

[22] Filed: Oct. 7, 1988

[30] Foreign Application Priority Data

Oct. 9, 1987 [DE] Fed. Rep. of Germany ....... 3734287

[51] Int. Cl.$^4$ ............................................. B60G 11/00
[52] U.S. Cl. ..................................... 280/688; 280/707
[58] Field of Search ............................... 280/688, 707; 104/148 MS; 308/10; 267/182

[56] References Cited

U.S. PATENT DOCUMENTS 3,941,402  3/1976  Yankowski et al. ................. 280/688

*Primary Examiner*—Richard A. Bertsch
*Attorney, Agent, or Firm*—Townsend and Townsend

[57] ABSTRACT

An electromagnetic support arrangement consists of at least one stator having a current-excited winding and a runner for rectilinear runner movements having at least one high-permeability runner iron section, the runner being movable perpendicularly to the magnetic field direction built up by the winding and the exciting current being controllable for each stator winding. The exciting current is variable in dependence upon at least one control parameter concerning the relative association of stator and runner. One of the possible preferred embodiments of the invention relates to the use of the electromagnetic support arrangement for wheel suspensions of a vehicle chassis or running gear.

14 Claims, 2 Drawing Sheets

ELECTROMAGNETIC SUPPORT ARRANGEMENT

The invention relates generally to an electromagnetic support arrangement and concerns in particular a use of this specific electromagnetic support arrangement for wheel suspensions of vehicle chassis and running gear.

For the force development in a magnetic field three different physical effects are known; firstly the forces between current conductors, secondly the forces between current conductors and magnetic materials and thirdly the forces at the interfaces of materials of different permeability. Fundamentally, these physical effects are due to the forces between moving charges.

To utilize the forces at the interfaces of substances of different permeability it is already known in electromagnetic switching devices, contactors, relays and the like for the interface at which the force engages to extend perpendicularly to the field direction. The movement of the iron core or runner is in the field direction. Due to the fact that the length of the flux path extending in air at the start of the movement is at least equal to the total movement length, the major part of the current in the exciting field coil is required for the buildup of the magnetic field in the air gap. As a result, in disadvantageous manner only a small magnetic conduction is achieved and consequently the pulling force at the start of the movement and thus the runner acceleration is small.

To improve these initial values the current in the field coil must be correspondingly increased. Towards the end of the limited movement of the iron core or runner due to the small air gap the maximum values occur for the traction force and acceleration. It is also unfavourable that such systems become very hot due to the high currents necessary.

Another disadvantage is that these known systems have only fixed nonlinear force-displacement characteristics and are thus not suitable either for use in cases in which a linear relationship between the force and movement travel is necessary or in cases in which an arbitrarily controllable force-displacement characteristic is favourable. The latter field of use includes for example machine mountings with dynamic load.

In the field of vehicle chassis and running gear as regards the supporting wheel suspensions high travel comfort and high travel safety are essential and different loading and travelling situations are to be compensated as completely as possible, leading in vehicles to different movement forms such as rolling, rocking, etc.

Vehicles are caused to execute oscillations by road and track irregularities and these impair the travelling comfort and safety. The oscillation buildup takes place in six degrees of freedom. Of particular significance are the vertical oscillation behavior, the pitch oscillation behaviour and the rocking oscillation behaviour of the vehicle.

The comfort of the vehicle is admittedly increased by soft suspension. However, softly suspended vehicles, in particular in the unloaded state, are liable to unpleasant oscillation properties when travelling through curves, starting and braking and involve safety risks. This applies in particular to vehicles which due to the lightweight construction have a large difference in weight between the empty and fully loaded state.

For travelling comfort, in particular the vertical oscillation buildup (vertical oscillations) is of significance and with a softer suspension smaller buildup accelerations occur than with a harder suspension. On the other hand, it is also necessary to damp the spring movements by oscillation dampers and a large oscillation damper force has disadvantageous effects on the travelling comfort. The matching of the suspension and the oscillation damping can admittedly be optimized with regard to the travelling comfort. This optimization is however not consistent with the requirements of travelling safety.

For travelling safety the change of the wheel load during travelling is decisive. Small dynamic wheel load oscillations are obtained by large oscillation damper forces, small axle mass and soft tires. A soft suspension and soft tyres however must not impair road holding in a curve, accelerating from standstill and braking. Accordingly, hitherto matching suspension and oscillation damping represents a compromise between travelling comfort and travelling safety.

DE-PS 3,410,473 discloses a suspension system for motor vehicles which installed between the unsprung and sprung mass parts of the vehicle. This suspension system consists of a mechanical, pneumatic or hydraulic support spring having a positive relatively large spring rate, a magnetically formed nonlinear correction spring arranged parallel thereto and acting in the manner of a deadcentre spring with negative spring rate at a zero passage of its spring characteristic and possibly of a likewise parallel shock absorber. The correction spring comprises a portion equipped in each case with permanent magnets on concentrically arranged ring discs, of which the one portion is connected to the sprung and the other portion to the unsprung mass to form a torsion spring. The torsion spring is adjustable by means of a device stepwise for controlling the level and improving suspension comfort. The magnetizing axes of the permanent magnets are arranged parallel to the movement direction of the correction spring, thereby giving a nonlinear characteristic.

A disadvantage with the aforementioned measures is the complicated construction they involve and lack of flexibility with regard to adaptation to different chassis and running gear. Employing such improving measures for chassis and running gear has also hitherto been restricted for reasons of costs to special vehicles, for example racing vehicles, and is not suitable for series installation in automobiles. In addition, such vehicle chassis and running gear only take discontinuous account of different load conditions and driving situations. The matching of suspension and oscillation damper today is still only an inadequate compromise between travelling comfort and safety.

Us-PS 3,006,656 discloses an arrangement operating on the principle of a powder coupling. Due to the electromagnetic holding forces a retardation force is generated here which is utilized for damping purposes, giving a fixed nonlinear force-displacement relationship.

The invention is based on the problem of making available a universally usable electromagnetic support arrangement with which different linear support force characteristics can be implemented.

The invention also aims at making available by using an electromagnetic support arrangement flexible vehicle chassis and running gear which under different travelling situations afford high safety and high travelling comfort.

To solve this problem the invention provides an electromagnetic support arrangement comprising at least one stator having a current-excited winding and a runner for rectilinear runner movements having at least one high-permeability runner iron section, the runner being movable perpendicularly to the magnetic field direction built up by the winding, and the exciting current for each stator winding being controllable. Preferably, the exciting current is variable in dependence upon at least one control parameter which relates to the relative association of stator and runner.

According to a preferred embodiment of the invention for the control of the arrangement at least one microprocessor is provided having at least one electronic control element which in dependence upon at least one sensor signal detecting a control parameter controls the exciting current in each stator winding.

The invention advantageously also provides an electromagnetic support arrangement for wheel suspensions of a vehicle chassis or running gear. Preferably, in each wheel suspension the exciting current for each stator winding is controllable in dependence upon the velocity and/or the level position and/or the acceleration state of the vehicle and wherein, as in the support arrangement in general, the starting position can be set either in a runner with one-high permeability runner iron by an additional parallel or series-connected element, or in a runner having at least two high-permeability runner irons can be set by the control of the stator windings themselves.

With the electromagnetic support arrangement according to the invention advantageously the interfaces to which the electromagnetic force engages run parallel to the magnetic field direction. The air gap or the length of the flux path running in air between the poles is independent of the movement or stroke length chosen. Consequently, the magnetic induction in the runner iron is also independent of the movement length or the stroke and is governed only by the number of ampere turns which the field energizes.

With the same dimensions and same currents, with the arrangement according to the invention compared with the known arrangement discussed at the beginning at the start of the travel a greater induction can be obtained in the runner iron and thus also a greater pulling force. Furthermore, in the support arrangement according to the invention in advantageous manner there is a current variation which because of its low maximum value per movement travel or stroke, i.e. because of a lower ratio of root-mean-square value to the arithmetic mean value of the current, leads to a more favourable utilization of the winding copper. This is particularly important with regard to the energetic consideration of the support arrangement.

It is apparent from a traction force configuration describing the system of this electromagnetic support arrangement that in favourable manner the force is independent of the position of the runner for constant current. This makes it possible to implement advantageously constant travel-independent characteristics in the working range of the arrangement.

Also essential to the utilization of the forces at the interfaces is the magnitude of the permeability. With the electromagnetic support arrangement according to the invention in advantageous manner an additional adaptation of the conditions is possible by changing the permeability of the runner section.

In advantageous manner in the electromagnetic support arrangement according to the invention a constant line of flux length in the air gap region is present, the air gap having a minimum size. For dynamic uses of the electromagnetic support arrangement it should be noted in particular that low eddy current damping is present and that by suitable driving oscillation situations, in particular in the resonance range of a system supported by the support arrangement according to the invention, can be effectively controlled, in particular with two runner irons and two stators by counterphase runner driving.

Due to the aforementioned utilization of the physical effects in the electromagnetic support arrangement it is possible in advantageous manner to obtain an electromagnetic support arrangement having a characteristic field with lines of action which can be influenced as desired in accordance with selectable parameters. Examples for a preferred use are not only dynamically loaded mountains in which an excellent level stabilizing can be implemented by controlling with opposite phase characteristic but also the use in particular in wheel suspensions of vehicles. In the latter case in advantageous manner a constructionally simple vehicle chassis or running gear can be obtained which by utilizing the electromagnetic force action can implement any desired characteristics or operational behavior and is suitable for economic installation in series production of vehicles. Advantageously, the electromagnetic support arrangement can be used as electromagnetic spring which can operate with linear characteristic and with corresponding alteration of the exciting current generates a linear force to pull the runner moving orthogonally to the magnetic field direction into the bore of the stator.

The electromagnetic arrangement provided comprising at least one stator having a current-excited winding and a runner having at least one runner iron section for rectilinear runner movements permits a compact and lightweight construction which can easily replace previously used spring damper arrangements in wheel suspensions. The control of the exciting current for the stator winding in dependence upon the speed of the vehicle permits in favourable manner adaptation of the spring rate to the optimum conditions necessary at different vehicle speeds with regard to travelling safety and comfort. The electromagnetic arrangement according to the invention can influence the vertical oscillation behaviour, the pitch oscillation behaviour and the rocking oscillation behaviour of vehicles favourably.

Buildup motions originating from travelling operation are responsible for the stimulation of vehicle oscillations. The oscillation behaviour is influenced by the tuning between the spring and oscillation damper. According to a preferred further development of the invention each wheel suspension comprises for the damping a control dependent on the velocity of the runner relatively to the stator. This makes it possible in advantageous manner to generate any desired damping characteristic and achieve optimum matchings of suspension and oscillation damper for all travelling situations.

For performing the controlled operations a sensor is provided for the speed of the vehicle and for each wheel suspension a sensor for the runner velocity. This makes it possible to take account of the conditions necessary at each wheel suspension as regards comfort and travelling safety in dependence upon the speed of the vehicle.

According to a preferred embodiment of the invention each wheel suspension comprises for the levelling of the vehicle a control depending on a signal of a displacement sensor. This makes it possible in advantageous manner to control the level position of the vehicle independently of the load condition thereof. In addition to the level position the spring rate and the damping characteristic of each wheel suspension of the vehicle chassis or running gear can be controlled in dependence upon the speed of the vehicle, a load-dependent correction and thus a level stabilization being achieved in travelling through curves, acceleration operations and braking operations. For this purpose advantageously at least one central acceleration sensor is provided which detects the acceleration forces of starting and braking operations and the centripetal forces when taking a curve.

For the control of the arrangement in favourable manner at least one microprocessor having at least one electronic control element is provided and controls the exciting current in each stator winding in dependence upon the sensor signals. If said microprocessor for example receives signals from the acceleration sensor the more highly loaded telescopic struts of wheel suspensions can be electromagnetically assisted. In a starting-up or accelerating operation the rigidities of the rear or front telescopic struts can be increased by stronger spring characteristics of the electromagnetic springs. In a similar manner, the inclination to rolling of a vehicle during a curve can also be reduced by strengthening the outer telescopic struts and reducing the rigidity of the inner telescopic struts. It is even possible to incline the vehicle against centrifugal force in curves.

In advantageous manner the signals of the various sensors are permanently applied to each microprocessor and are cyclically called up. The output signals of the microprocessor represent a function of the sensor signals and are characteristic of the desired value of the exciting current for the stator winding. They are present in digital form and are converted to analog signals in a D/A converter. A control element (amplifier) amplifies the incoming currents to the desired value of the magnetic-field-generating current.

In its mode of operation the microprocessor follows a computing rule which results from the specific requirements of the user and can be compiled by any expert. In this computing rule all the force-displacement dependencies between stator and runner may be implemented and said force-displacement dependencies can be influenced by external parameters which are reported to the microprocessor by means of sensors.

According to a preferred further development of the invention the runner is made cylindrical and comprises at least one high-permeability runner iron section which is arranged between non-magnetic plastic sections of the runner whilst the stator has an iron core which is interrupted to form opposing pole shoes by a bore for the runner which has a diameter which is greater than the core cross-section in the region of the bore, the iron core thickness in the region of the bore being equal to the length of each runner iron section. For guiding the runner bearing bushes of plastic are mounted on the stator in front of and behind the bore. This gives a particularly compact structure for the electromagnetic arrangement.

Preferably the runner comprises at least one further high permeability runner iron section and at least one further associated stator is provided. This gives further control possibilities because both tensile and compressive forces can be transmitted. In conjunction with the coupled control of the stator windings in advantageous manner at higher speeds a lower level position and higher spring rigidity can be achieved.

To prevent the runner moving out or in too far a tension and pressure stop is also provided.

Figure 2:
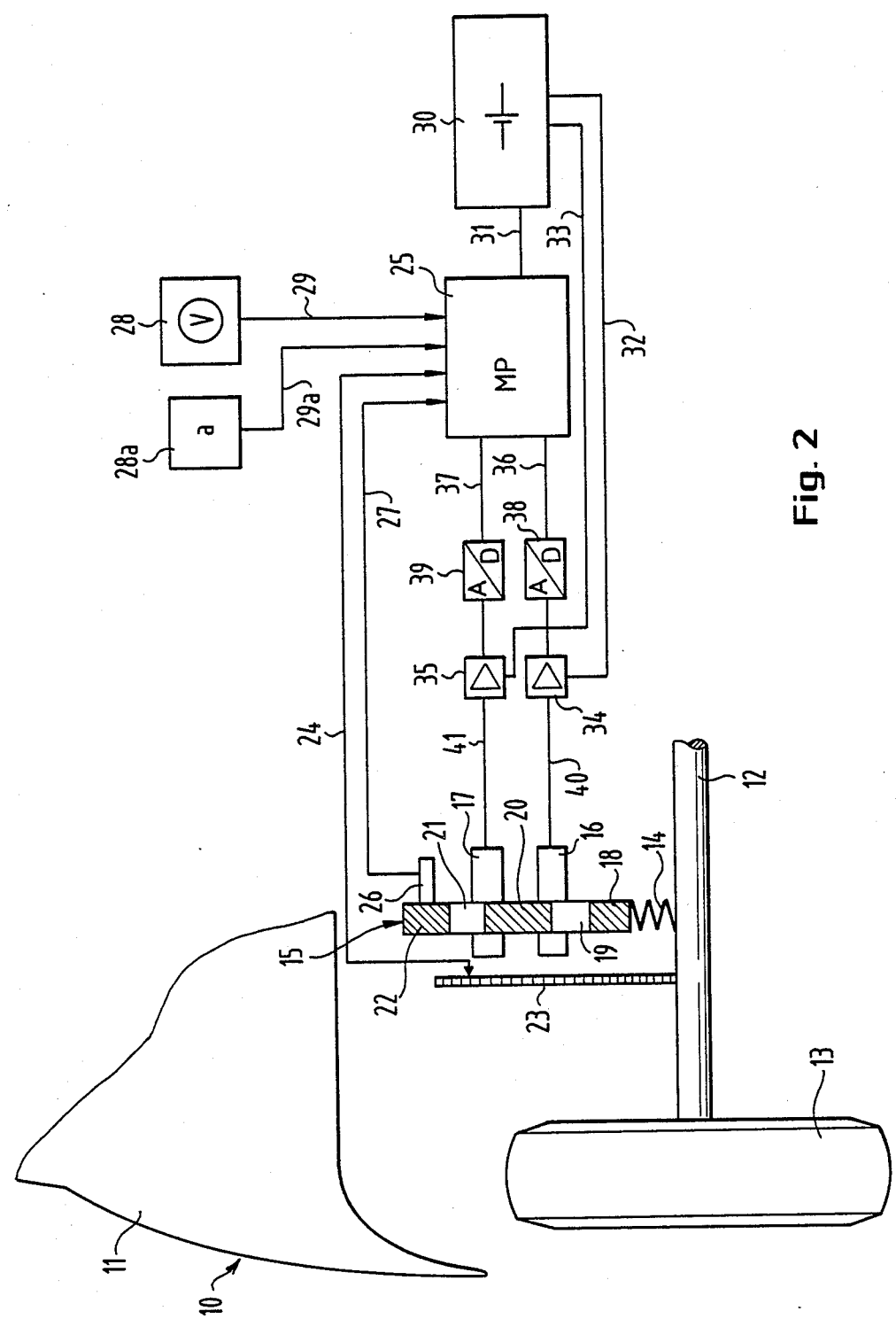

Further details, features and advantages of the invention will be apparent from the following description in which the invention is explained in detail with the aid of the attached drawings, wherein:

FIG. 1 is a perspective view of a simple electromagnetic support arrangement; and FIG. 2 is a schematic illustration of a motor vehicle telescopic strut having a control of the level position, spring rate and damping characteristic in dependence upon the speed of the motor vehicle.

FIG. 1 shows an embodiment of an electromagnetic arrangement consisting of a cylindrical runner 45 provided for rectilinear runner movements and a stator 46. The arrangement illustrated serves for example to support a stationary machine which is not shown, the stator 46 being supported via a stand arrangement with bottom plate on a foundation or the like which is not shown and the runner 45 being connected at its upper end to a support means of a machine, also not shown. The runner 45 comprises a runner iron 47 which is secured between nonmagnetic plastic sections 48 and 49. The runner 45 is guided in two bearing bushes 50 and 51 which consist of plastic and are secured to the iron core of the stator 46. In the construction of the arrangement with a runner iron 47 an element which is not illustrated is also provided which defines the starting position of the runner 45, for example a support spring. If at least two runner irons and at least two stators are provided the arrangement itself can define the starting position.

The stator 46 consists of a usual transformer iron core which is interrupted by a perpendicular bore for the runner 45 to form opposing pole shoes. The diameter of the bore is greater than the core cross-section in the region of the bore and the iron core thickness in the region of the bore is equal to the length of the runner iron 47. The section of the approximately rectangular iron core 52 opposite the bore for the runner is provided with a winding 53 of which the ends 54 and 55 are lead outwardly for the supply of exciting current. The movement direction of the runner 45 is indicated by an arrow 56.

The electromagnetic arrangement of runner 45 and stator 46 can be denoted generally as an electrical machine for rectilinear runner movements or as linear motor. In the embodiment of the arrangement shown in FIG. 1 the runner iron 47 in the unloaded state with the winding current switched on is completely, with a small air gap, between the two pole shoes, which are formed by the opposing sides of the runner bore. If now an external force acts on the runner 45 in the direction of the possible runner degree of freedom the magnetic field of the stator 46 formed with approximately constant flux line length produces a reaction force which acts against the external force and tends to keep the runner iron 47 between the pole shoes. The magnetic reaction force is theoretically independent of the displacement. Due however to the inhomogeneities of the magnetic field occurring in practice the reaction forces increase with the spring travel. Since the ampere turn number of the winding is also decisive for the magnitude of the reaction force the slope of the force-displacement characteristic of the arrangement can be regulated by the current strength.

The action line of the reaction force of the magnetic field on the runner iron is always directed in the axial direction of the pole shoe bore. Accordingly, when the winding current is switched on the runner iron section tends to rest in equilibrium between the pole shoes. The reaction force of the magnetic field is independent of the poling of the exciting current.

FIG. 2 shows a schematic illustration of the construction of a wheel suspension 10 of an automobile chassis. Only a part of the body work, designated by 11, of the automobile is shown. A wheel 13 is mounted in usual manner on a telescopic strut runner 12 and can move together with the telescopic strut runner 12 in the direction towards and away from the body work 11.

Between the telescopic strut runner 12 and the body work 11 a conventional coil spring 14 is mounted parallel to the arrangement according to the invention and is provided for taking up the wheel load unloaded weight forces. The coil spring 14 can advantageously be made of smaller dimensions when using the support arrangement according to the invention, thereby also obtaining a saving in weight.

Arranged parallel to said helical spring 14 is an electromagnetic arrangement comprising a runner 15 and two stators 16 and 17 arranged above each other. The runner 15 is secured in a manner not illustrated to the telescopic strut runner 12 and projects perpendicularly from the latter upwardly through the stators 16 and 17, the upper end of the runner 15 being exposed. The stators 16 and 17 are mounted in a manner not shown on the body work of the motor vehicle. The runner 15 can move rectilinearly through the stators 16 and 17.

The runner 15 is made cylindrical and consists from the bottom to the top of a nonmagnetic plastic section 18, a high-permeability runner iron 19, a nonmagnetic plastic section 20, a high-permeability runner iron section 21 and a terminating nonmagnetic plastic section 22.

Also mounted on the telescopic strut runner 12 is a displacement sensor 23 which via a line 24 emits a level signal to a microprocessor 25 which is mounted at a distance away on the body work 11.

A sensor 26 for detecting the velocity of the runner 15 is arranged in the upper region of said runner 15 and via a line 27 furnishes a runner velocity signal to the microprocessor 25. The speed of the vehicle is detected by a speed sensor 28 and transmitted to the microprocessor 25 via a signal line 29. Also shown is a central acceleration sensor 28a, the signal of which is applied via a line 29a to the microprocessor 25.

A battery 30 is provided for the power supply and is connected via a line 31 and the body work ground to the microprocessor 25 and via lines 32 and 33 to amplifiers 34 and 35.

Via control lines 36 and 37 the microprocessor 25 supplies respective digital control signals to D/A converters 38 and 39. The output of the converters 38 and 39 controls the amplifiers 34 and 35 respectively. The amplifier 34 furnishes via a line 40 an exciting current to the winding of the stator 16, the magnitude of the exciting current advantageously being governed by the control signal present in analog form at the amplifier and originating from the microprocessor. In corresponding manner, via a line 41 an exciting current is applied by the amplifier 35 to the winding of the stator 17.

The arrangement shown in FIG. 2 comprises a runner 15 having two runner iron sections 19 and 21 which are separated by a nonmagnetic plastic section. Associated with each runner iron is a stator 16 and 17 respectively. The runner 15 can therefore be led by the second magnetic reaction force at the stator 17 without external mechanical force out of the air gap of the stator. Depending on the excitation of the respective stator turns the runner 15 can thus be held in any desired position.

The mode of operation of the electromagnetic arrangement as controllable telescopic strut will be explained in detail below. When the vehicle is at rest only the coil spring 14 is operative and takes up the wheel load unloaded weight forces. A tension and pressure stop not shown prevents excessive extension or retraction. If now the electromagnetic arrangement is activated the spring rates of the coil spring 14 and of the electromagnetic spring connected in parallel summate and the two reactions forces also summate with each other.

The microprocessor 25 now controls the additional electromagnetic component depending on the load state of the automobile and the travelling situation, the output signals of the speed sensor 28, the displacement sensor 23, the runner velocity sensor 26 and the acceleration sensor 28a via the line 29a characterizing the respective operating situation and being permanently applied to the microprocessor 25.

Corresponding to a computing rule which depending on the respective requirements can be adapted in a manner known to the expert, the microprocessor 25 calls up the information of the sensors at its input cyclically and processes this information. The digital output signals of the microprocessor 25 are converted to analog signals and characterize the desired value of the current for the respective stator generating the magnetic field.

For defining the respective desired value in a four-wheeled vehicle four displacement pickups 23 transmit the level distance between body work 11 and the telescopic strut runner 12. By detecting the runner velocity, by regulating the current flow to the individual stator windings damping values for the respective wheel suspensions may also be individually controlled. The spring characteristics of the electromagnetic spring can thus be adapted to the load situation and the damping requirement in fractions of a second.

The accelerating forces when starting and braking and the centripetal forces during travelling in curves are detected by the central acceleration sensor, the more highly loaded wheel suspensions being electromagnetically assisted by corresponding control by the microprocessor. In addition, in starting and accelerating operations the microprocessor can increase the rigidity of the rear or front wheel suspensions by steeper spring characteristics of the electromagnetic springs. In a similar manner the inclination to roll of a vehicle is reduced during travelling in a curve by strengthening the outer wheel suspensions and reducing the rigidity of the inner wheel suspensions.

The runner 15 with its two runner iron sections 19 and 21 permits transmission of both tensile and compressive forces. In conjunction with the control by the microprocessor 25, which controls both stator windings in coupled mode, in advantageous manner a speed-dependent low level position of the vehicle and a higher spring rigidity can be achieved.

With the novel vehicle chassis and running gear it is thus possible in advantageous manner not only to control the level position of the vehicle independently of the load state but also to effect a regulation of the level position spring rate and damping characteristic in dependence upon the speed of the vehicle; in travelling round curves and on positive and negative acceleration the spring rate and damping characteristic are corrected in dependence upon the load for each individual wheel suspension and a level stabilization thus achieved.

With the novel vehicle chassis and running gear the parallel-connected mechanical support spring necessary for economic reasons takes up the major part of the spring forces whilst the range of the spring and damping forces to be additionally controlled is covered in advantageous manner by the electromagnetic arrangement.

The use of the electromagnetic arrangement is not however restricted to the field of vehicles but can be exploited throughout machine construction in cases in which with simple means a level stabilization is to be achieved and the effects of position-changing influencing forces limited.

I claim:

1. Electromagnetic support arrangement comprising at least one stator having a current excited winding and a runner for rectilinear movements having at least one high-permeability runner iron section, the runner being movable perpendicularly to the magnetic field direction built up by the winding, and the exciting current being controllable for each stator winding, wherein the exciting current is variable in dependence upon at least one control parameter which concerns the relative association of stator and runner, and wherein as control parameter the acceleration of the runner relatively to the stator is provided.

2. Electromagnetic support arrangement comprising at least one stator having a current excited winding and a runner for rectilinear movements having at least one high-permeability runner iron section, the runner being movable perpendicularly to the magnetic field direction built up by the winding, and the exciting current being controllable for each stator winding, wherein the exciting current is variable in dependence upon at least one control parameter which concerns the relative association of stator and runner, and wherein for the control of the arrangement at least one microprocessor is provided which comprises at least one electronic control element which in dependence upon at least one sensor signal detecting a control parameter controls the exciting current in each stator winding.

3. Electromagnetic support arrangement according to claim 2, wherein as control parameter a position of the stator relatively to the runner is provided.

4. Electromagnetic support arrangement according to claim 2, wherein as control parameter the movement velocity of the runner relatively to the stator is provided.

5. Electromagnetic support arrangement according to claim 2, wherein as control parameter the acceleration of the runner relatively to the stator is provided.

6. Electromagnetic support arrangement comprising at least one stator having a current excited winding and a runner for rectilinear movements having at least one high-permeablity runner iron section, the runner being movable perpendicularly to the magnetic field direction built up by the winding, and the exciting current being controllable for each stator winding, wherein the exciting current is variable in dependence upon at least one control parameter which concerns the relative association of stator and runner, and wherein for the control of the arrangement at least one microprocessor is provided which comprises at least one electronic control element which in dependence upon at least one sensor signal detecting a control parameter controls the exciting current in each stator winding, and wherein for the control signals of each microprocessor at least one D/A converter is provided of which the analog output is applied to an amplifier for the exciting current.

7. Electromagnetic support arrangement comprising at least one stator having a current excited winding and a runner for rectilinear movements having at least one high-permeability runner iron section, the runner being movable perpendicularly to the magnetic field direction built up by the winding, and the exciting current being controllable for each stator winding, wherein the runner is made cylindrical and each high-permeability runner iron section is arranged between non-magnetic plastic sections of the runner, and wherein the stator comprises an iron core which for forming opposite poly shoes is interrupted by a bore for the runner having a diameter which is greater than the core cross-section in the region of the bore, the iron core thickness in the region of the bore being less than the length of each runner iron section.

8. Electromagnetic support arrangement comprising at least one stator having a current excited winding and a runner for rectilinear movements having at least one high-permeability runner iron section, the runner being movable perpendicularly to the magnetic field direction built up by the winding, and the exciting current being controllable for each stator winding, wherein the runner is made cylindrical and each high-permeability runner iron section is arranged between non-magnetic plastic sections of the runner, and wherein the stator comprises an iron core which for forming opposite poly shoes is interrupted by a bore for the runner having a diameter which is greater than the core cross-section in the region of the bore, the iron core thickness in the region of the bore being less than the length of each runner iron section, and wherein for guiding each runner in front of and behind the bore bearing bushes of plastic are mounted on the stator, and for each runner a pulling and pressure stop are provided.

9. Electromagnetic support arrangement for wheel suspensions of a motor vehicle chassis or running gear which each comprise at least one running wheel provided with a suspension means and a damping means, the arrangement comprising at least one stator having a current excited winding and a runner for rectilinear movements having at least one high-permeability runner iron section, the runner being movable perpendicularly to the magnetic field direction built up by the winding, and the exciting current being controllable for each stator winding.

10. Electromagnetic support arrangement for wheel suspensions of a motor vehicle chassis or running gear which each comprise at least one running wheel provided with a suspension means and a damping means, the arrangement comprising at least one stator having a current excited winding and a runner for rectilinear movements having at least one high-permeability runner iron section, the runner being movable perpendicularly to the magnetic field direction built up by the winding, and the exciting current being controllable for each stator winding, wherein in each wheel suspension the exciting current for each stator winding is controllable in dependence upon the speed and/or level position and/or the acceleration condition of the vehicle.

11. Electromagnetic support arrangement for wheel suspensions of a vehicle chassis or running gear comprising at least two stators having current excited windings and a runner for rectilinear movements having a least two high-permeability runner iron sections, the runner being movable perpendicularly to the magnetic field direction built up by the windings, and the exciting current being controllable for each stator winding, wherein in each wheel suspension the exciting current for each stator winding is controllable in dependence upon the speed and/or level position and/or the acceleration condition of the vehicle.

12. Electromagnetic support arrangement for wheel suspensions of a vehicle chassis or running gear comprising at least two stators having current excited windings and a runner for rectilinear movements having a least two high-permeability runner iron sections, the runner being movable perpendicularly to the magnetic field direction built up by the windings, and the exciting current being controllable for each stator winding, wherein in each wheel suspension the exciting current for each stator winding is controllable in dependence upon the speed and/or level position and/or the acceleration condition of the vehicle, and wherein are provided for the speed-dependent control a speed sensor, for the level position of the vehicle a displacement sensor and for the load-dependent control of the level position of the vehicle in curves and positive and negative acceleration processes at least one central acceleration sensor.

13. Electromagnetic support arrangement comprising at least one stator having a current excited winding and a runner for rectilinear movements having at least one high-permeability runner iron section, the runner being movable perpendicularly to the magnetic field direction built up by the winding, and the exciting current being controllable for each stator winding, wherein the exciting current is variable in dependence upon at least one control parameter which concerns the relative association of stator and runner, wherein the runner is made cylindrical and each high-permeability runner iron section is arranged between non-magnetic plastic sections of the runner and wherein the stator comprises an iron core which for forming opposite poly shoes is interrupted by a bore for the runner having a diameter which is greater than the core cross-section in the region of the bore, the iron core thickness in the region of the bore being less than the length of each runner iron section.

14. Electromagnetic support arrangement comprising at least one stator having a current excited winding and a runner for rectilinear movements having at least one high-permeability runner iron section, the runner being movable perpendicularly to the magnetic field direction built up by the winding, and the exciting current being controllable for each stator winding, wherein the exciting current is variable in dependence upon at least one control parameter which concerns the relative association of stator and runner, wherein the runner is made cylindrical and each high-permeability runner iron section is arranged between non-magnetic plastic sections of the runner and wherein the stator comprises an iron core which for forming opposite poly shoes is interrupted by a bore for the runner having a diameter which is greater than the core cross-section in the region of the bore, the iron core thickness in the region of the bore being less than the length of each runner iron section, wherein for guiding each runner in front of and behind the bore bearing bushes of plastic are mounted on the stator, and for each runner a pulling and pressure stop are provided.

* * * * *